Aug. 2, 1927.  1,637,715
F. T. SMALL ET AL
MANUFACTURE OF PLASTIC MATERIALS AND TO APPARATUS THEREFOR
Filed April 7, 1923   3 Sheets-Sheet 1

INVENTORS
FREDERICK T. SMALL AND
WILLIAM A. DICKIE
By their Attorneys,

Aug. 2, 1927.  
F. T. SMALL ET AL  
1,637,715  
MANUFACTURE OF PLASTIC MATERIALS AND TO APPARATUS THEREFOR  
Filed April 7, 1923  3 Sheets-Sheet 3
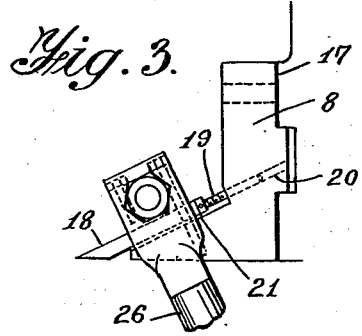
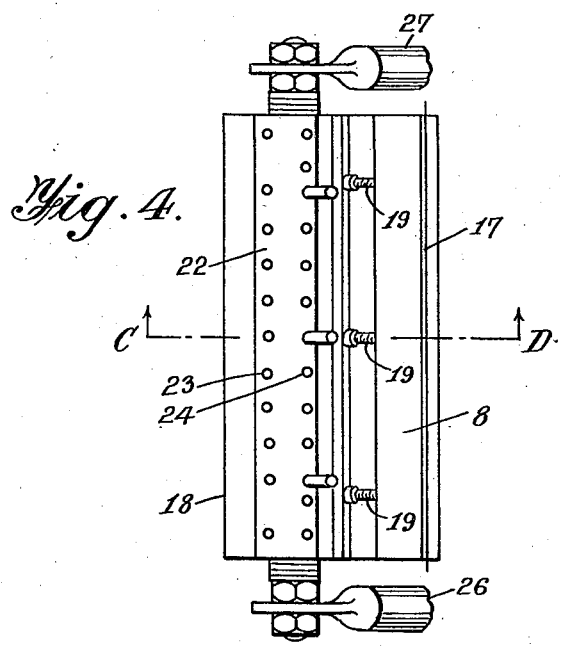
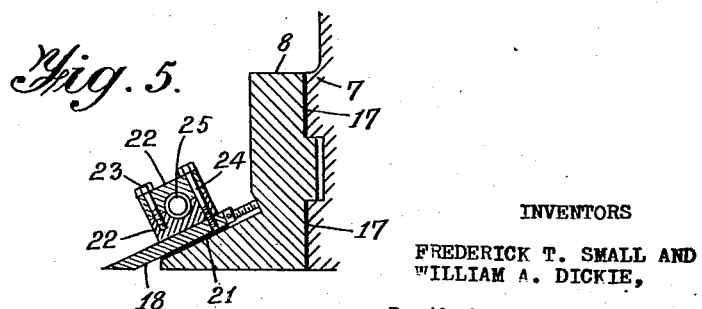
INVENTORS  
FREDERICK T. SMALL AND  
WILLIAM A. DICKIE,  
By their Attorneys, Patented Aug. 2, 1927.

1,637,715

UNITED STATES PATENT OFFICE.

FREDERICK TROUTON SMALL AND WILLIAM ALEXANDER DICKIE, OF SPONDON, NEAR DERBY, ENGLAND, ASSIGNORS TO CELANESE CORPORATION OF AMERICA, A CORPORATION OF DELAWARE.

MANUFACTURE OF PLASTIC MATERIALS AND TO APPARATUS THEREFOR.

Application filed April 7, 1923, Serial No. 630,608, and in Great Britain April 21, 1922.

This invention relates especially to a process and apparatus for cutting sheets from blocks or slabs (hereinafter shortly referred to as blocks), of celluloid-like materials which contain no volatile solvents or only a very small amount of volatile solvent, whether as the result of the process of manufacture of such plastic materials or as the result of prolonged seasoning. The invention applies in particular to celluloid-like plastic materials consisting of or having a basis of cellulose acetate but may be applied to plastic materials consisting of or having a basis of other fatty acid cellulose esters or of ethyl, benzyl or other ethers of cellulose or of other low-flammable cellulose derivatives.

The invention applies especially to the cutting of sheets from blocks such as referred to, but it may also be applied for cutting rods and like lengths out of the same.

Blocks of plastic materials such as before referred to, containing no volatile solvent or very little volatile solvent, present special difficulties in cutting into sheets, owing to the resistance which they present to the passage of the knife, and it has therefore not been hitherto possible to cut sheets from such blocks easily and evenly.

According to the present invention the block of cellulose acetate or other plastic material such as referred to, is cut into sheets with the aid of a heated knife so that the material in the neighbourhood of the knife is softened or rendered plastic by the hot edge of the knife and can thus yield more readily to the cutting edge and allow the sheet to be more easily and evenly severed from the block.

According to a further part of the invention we may apply heat to the surface layers of the block so as to heat the same to a greater or less depth, and thereby further facilitate the cutting of the sheets from the block. Such surface heating may extend to any desired depth according to the depth of the cut to be made or other circumstances.

The knife may be heated by any suitable means, as for example by passing steam through channels therein, or by circulating hot oil through such channels, or by electric resistance heating, but preferably by means of electrical induction heating.

Any suitable device or devices may be employed for applying heat to the surface layers of the block as mentioned. Such devices may consist for example of one or more heated plates, blocks or surfaces disposed or adapted to contact with the block of plastic material which is cut by the heated knife. The surface layer heating device or devices may be heated by any suitable means such for example as steam, hot oil or electric resistance or induction heating, but preferably the latter.

The base of the block of plastic material should be firmly held, so that the pressure of the knife shall not lift or shift the block during the cut. This may be effected by any suitable means, such as by employing for the blocks of plastic material, base plates or carriers provided with dovetail or other grooves or keying devices into which the plastic material of the block is pressed, for example in the operation of moulding the block in the block press, and which can then be transferred with the block to the cutting machine and secured therein for cutting the sheets. It is important that the material in front of the knife shall offer less resistance to deformation than the material at the parts keyed or otherwise held to the base or carrier, as otherwise the block would be persistently pushing off the base or carrier. This result can be attained by the employment of a heated knife or tool according to the invention.

For cutting the blocks into sheets any suitable machine may be employed, such as reciprocating "planing" or sheeting machines of the character employed in the production of celluloid sheets, but provided with the requisite means for heating the knife, and with auxiliary means for heating the surface layers of the block if such auxiliary heating is to be employed. Such auxiliary heating means may in particular consist of heated blocks or plates extending across the machine at a suitable distance in front of and behind the knife respectively, and arranged by spring pressure or otherwise to make contact with the surface of the block as this travels under the knife. Such heating blocks or plates may be arranged to be raised and lowered together with the knife or independently of it.

We will describe by way of illustration, with reference to the accompanying drawings, one form of apparatus constructed in accordance with the invention, it being understood that this is only given by way of example and that the means for heating the knife and the surface heating devices, and the details of construction, may be varied without departing from the spirit of the invention, and also that the surface heating means may be omitted or varied as desired.

The drawings show the invention applied to a planing or sheeting machine of the well known type, only so much of the machine being shown as is necessary to enable the invention to be understood.

Fig. 3 is a detail side elevation and Fig. 4 is a plan of the knife and knife carrier block, and Fig. 5 is a vertical section on line C—D Fig. 4.

Figure 1:
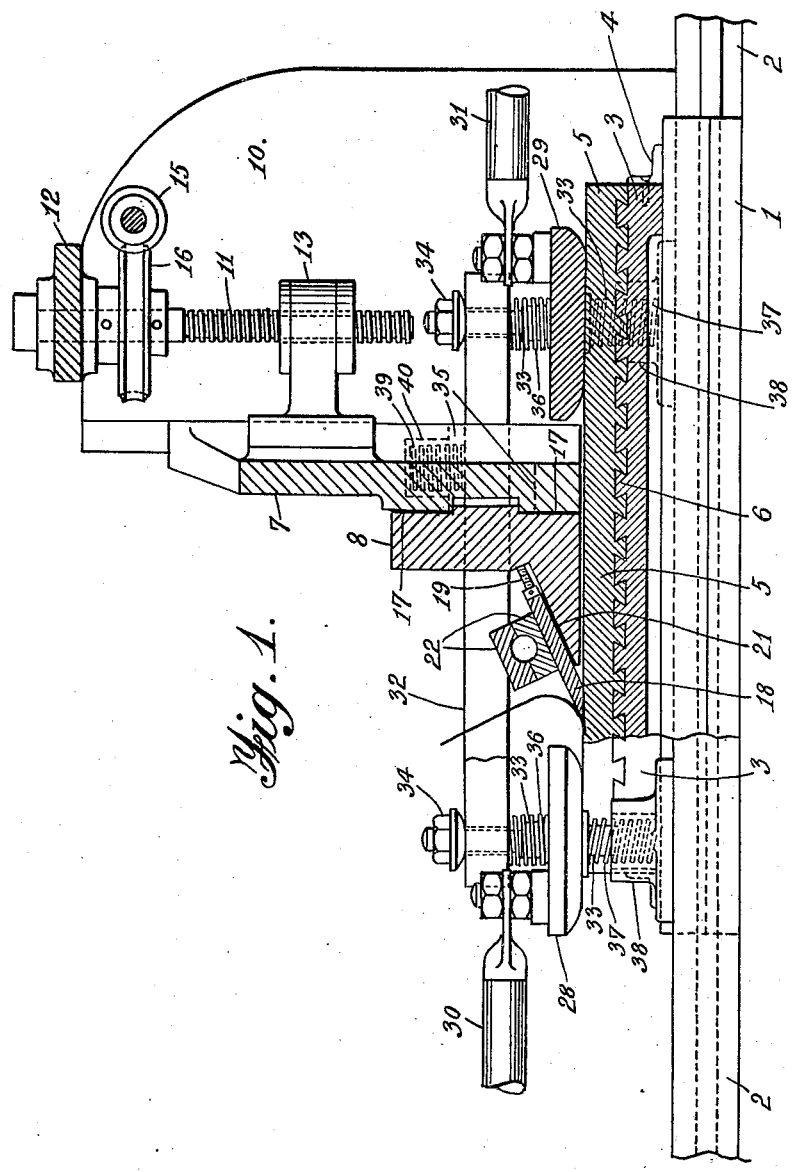
Fig. 1 is a sectional elevation of the apparatus, the section being taken on the broken line A—B Fig. 2.

1 represents the usual bed or table of the machine which is reciprocated on gibs of the side frames 2 by the usual means, not shown. 3 is a carrier plate for the block to be cut, this plate being removably secured on the bed 1 by screwing to angle bars 4 thereon (Fig. 1). The block 5 to be cut is keyed as before mentioned on the carrier plate 3 by dovetail grooves as shown at 6 Fig. 1.

Figure 2:
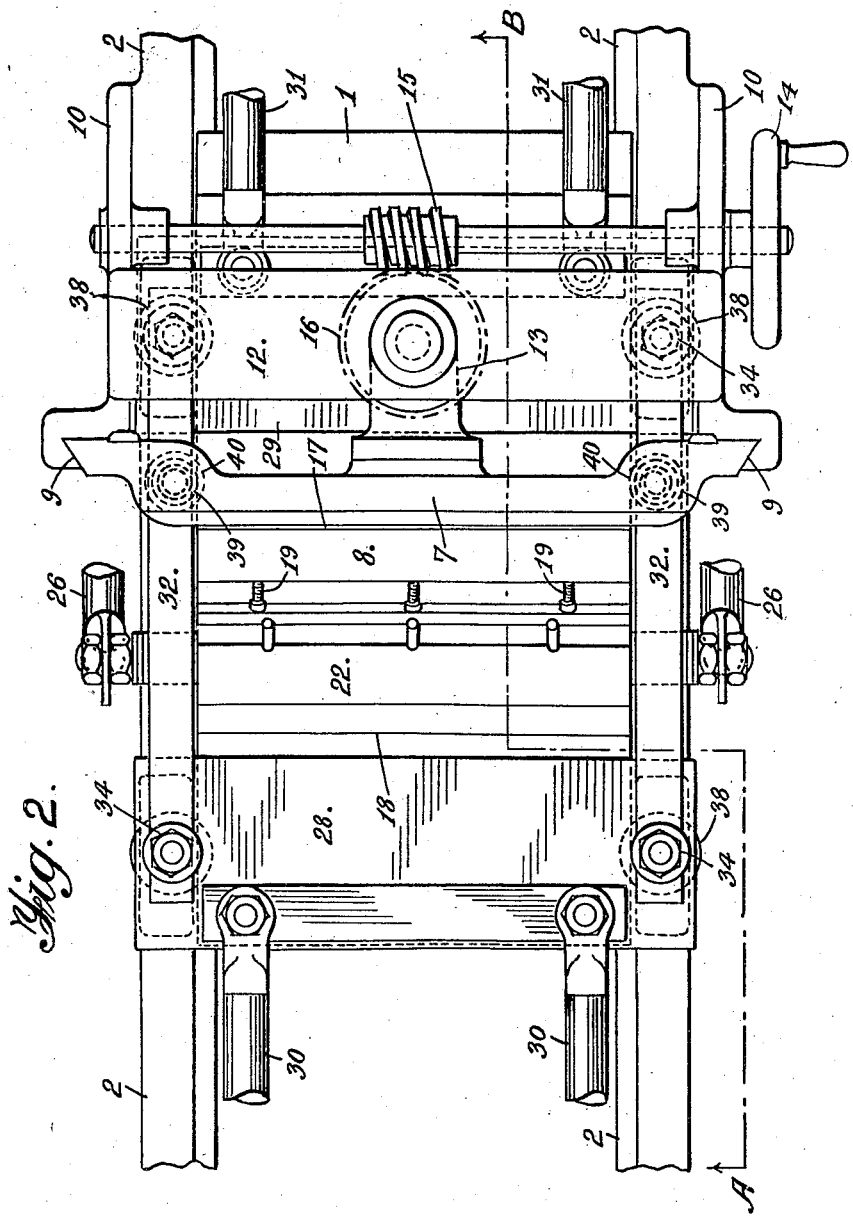
Fig. 2 is a plan of the apparatus.

7 is the transverse frame or knife carriage that carries the knife carrier block 8, this frame or bridge being vertically adjustable in guides or gibs 9 of side frames 10 by a micrometer screw 11 mounted in a transverse head plate 12 and working in the nut 13 of the bridge 7 and operated by a hand wheel 14 (Fig. 2) through worm gear 15, 16 as usual.

8 is the knife carrier block, which is insulated from the knife carrier bridge 7 by an asbestos sheeting 17. 18 is the knife mounted on the knife carrier block 8 by adjusting screws 19 working in threaded holes 20 thereof (Fig. 3) and serving for levelling the knife, 21 is an asbestos sheet fitted between knife 18 and knife carrier block 8. 22, 22 are two iron bars extending the width of the knife and making good metallic contact therewith, these bars each having a semicircular groove so that when secured together by the bolts 23, 24 they accommodate between them a length of thick copper cable 25, the bolts 24 screwing into the knife 18 as seen in Fig. 5. The cable 25 extends the width of the knife and has its ends connected to the leads 26, 27 of an alternating circuit. A very low voltage alternating current is supplied to the knife heater cable 25, whereby the rapidly changing magnetic field due to the current in this cable heats the steel bar 22 in contact with the knife. This method is preferred as being safe from dangers of fires due to short circuits or fusing of resistances such as might occur with resistance heating, and temperatures up to about 200° C. can be maintained and readily controlled with such an arrangement. The heat from the electrical heater extending along the knife is transmitted to the cutting edge, i. e. the place of actual shearing of the material, thus rendering the material in contact with the edge more plastic and reducing the resistance to such an extent that the material can be readily cut.

The height of the knife carrier above the bed of the machine can be varied by the micrometer screw 11 to adjust the depth of cut taken by the knife.

28, 29 are iron blocks or plates extending across the machine in front of and behind the knife respectively, and arranged to be heated electrically, preferably by electric induction heating, in a similar way to the knife. 30, 30 and 31, 31 indicate the electric leads therefor. These heating irons 28, 29 are mounted on side bearers or yoke bars 32, 32 in such connection with the knife carriage 7 that as the knife is lowered the heating irons are lowered with it, while providing the necessary resilience. For this purpose the heating irons 28, 29 shown as formed with studs or stems 33, the reduced upper ends of which project through holes in the side bearers 32 and are threaded to receive retaining nuts 34, the side bearers 32 passing through gaps 35 in the sides of the knife carriage 7, tension springs 36, 36 being fitted on the stems 33 between the heating irons 28, 29 and the side bearers 32, and supporting springs 37 being fitted in sockets 38, 38 to embrace the stems 33 below the heating irons while springs 39, 39 fitted in sockets 40 (Fig. 1) in the sides of the knife carriage 7 bear on the top of the side bearers 32. The arrangement of the heating irons is such that they can make light contact with the surface of the material to be cut. The tension springs 37 prevent the heating irons from fouling the surface of the material and spoiling its appearance, and the leading and following edges of the heating irons are shown as rounded with the same object. The supporting springs 37 and 39 serve to carry the bearers for the heating irons in a mean position suited to the height of the block to be cut and may also serve to take up inequalities in the heights of the heating irons produced by the operation of cutting.

The heating irons serve to heat the surface layers of the block or slab of material travelling beneath them to a suitable depth, say about equal to the depth of the desired cut.

In operation, the block of material, keyed to the carrier plate referred to, is secured on the reciprocating bed 1 of the machine, and the knife and heating irons are lowered to the desired extent for the cut, the sheet being severed from the block or slab in the forward travel of the latter against the knife. The knife and heating irons can then be further lowered for the next cut and so on.

In order to secure heating throughout the necessary depth before removing a very thick sheet, the heating irons only may be lowered, the knife being removed, and the table be allowed to travel to and fro so that the block or slab is ironed by the heating irons, the knife being then replaced and lowered to effect the cut.

The knife and heating irons might of course be reciprocated instead of the bed or table of the machine.

Instead of arranging the knife and heating irons to be lowered together, they may be arranged to be lowered independently of each other.

The process above described can be readily applied for the cutting of rods or like lengths of material of round, square or any other sectional shape out of blocks of materials of the character referred to, containing no volatile solvents or only a very small amount thereof. For this purpose it is only necessary to employ heated knives or cutting tools of the required shapes according to the sectional shape of the lengths to be cut. In conjunction with the cutting tool an auxiliary device or devices for heating the surface layers of the block may be employed in a manner similar to what is above described. The tools for cutting the rods or other lengths of material may be of any known or suitable kind, such for example as the cold tools which are commonly employed for cutting such rods or lengths out of volatile solvent-containing blocks of celluloid, but provided with means for heating the knife or cutting tool, for example electric heating means similar to those above described for heating the sheet cutting knife. For cutting rods, for example, one or more tools comprising a circular cutting edge may be employed just like those usually employed for cutting rods from ordinary volatile-solvent containing celluloid blocks, but provided with electric or other heating means, and, for clearing away the material or residue between the portions cut by the rod or like cutting tool, clearing tools like those usually employed for this purpose in cutting rods and the like from ordinary celluloid blocks may be used to clear away the residue between the cuts and straighten the top of the block, the clearing tool being also heated.

The tools may be mounted in the known way in a frame or carrier adapted to be traversed across the block by a handle and screw, for cutting out the rods or like lengths consecutively across the block in the known way. In short the tools and cutting mechanism may be like those commonly employed for cutting rods or lengths out of ordinary celluloid blocks, but provided with heating means.

The traversing tool frame or carrier referred to may be mounted in place of the sheet cutting knife on the knife carrier block of a sheet cutting machine such as above described.

One or more heating blocks or plates for heating the surface layers of the block may be employed in conjunction with the cutting tools, and may be arranged to be raised and lowered together therewith or independently of same. For this purpose one or more heating plates or irons may be employed behind or before or both behind and before the cutting tool, similarly to what is above described, or one may employ the same heating plate or plates as those particularly above described for this purpose, simply substituting the cutting tool attachment in place of the sheet cutting knife.

Rods or other lengths obtained by cutting with hot tools as described present the advantage over those cut in the usual way with cold tools from ordinary volatile solvent containing material that they do not require to be seasoned at all or but very little and therefore do not undergo the distortion to which the latter are subject during the seasoning which they require.

For the purpose of the invention any other suitable machine or apparatus than that described may be employed, comprising a heated knife or tool, and any other suitable means may be employed for applying heat to the surface layers of the material to be cut into sheets or lengths.

What we claim and desire to secure by Letters Patent is:—

1. Method or process of cutting sheets from blocks of low-flammable celluloid-like materials having a basis of low-flammable cellulose derivative and substantially free from volatile solvent, characterized in that the sheets are cut from the block of said material by means of a heated knife, whereby the low-flammable celluloid-like material in the neighborhood of the knife is softened and rendered plastic and enabled to yield more readily to the cutting edge.

2. Method or process of cutting sheets from blocks of low-flammable celluloid-like materials having a basis of low-flammable cellulose derivative and substantially free from volatile solvent, characterized in that the sheets are cut from the block of said material by means of a heated knife, whereby the low-flammable celluloid-like material in the neighborhood of the knife is softened and rendered plastic, and that auxiliary heat is applied to the surface layers of the block to heat the same and thereby further facilitate the cutting of the sheets therefrom by the heated knife.

3. A sheet cutting machine for cutting sheets from blocks of low-flammable celluloid-like materials having a basis of low-flammable cellulose derivative and substantially free from volatile solvent, said machine comprising a sheet cutting knife, means for heating said knife and auxiliary heating means for applying heat to the surface layers of the block to be cut by the heated knife.

4. A sheet cutting machine for cutting sheets from blocks of low-flammable celluloid-like materials having a basis of low-flammable cellulose derivative and substantially free from volatile solvent, said machine comprising in combination a reciprocating bed for the block, a sheet cutting knife disposed above the bed, means for heating the sheet cutting knife, means for raising and lowering said knife, a resiliently mounted auxiliary heating device disposed above the bed and adapted to contact with the surface of the block in the reciprocation and thereby to heat the surface layers thereof, and means for heating said auxiliary heating device.

5. A sheet cutting machine for cutting sheets from blocks of low-flammable celluloid-like materials having a basis of low-flammable cellulose derivative and substantially free from volatile solvent, said machine comprising in combination a reciprocating bed for the block, a sheet cutting knife disposed above the bed, resiliently mounted auxiliary heating means disposed above the bed and adapted to be lowered together with the knife and in the lowered position to contact with the surface of the block in the reciprocation and thereby to heat the surface layers thereof, means for heating the sheet cutting knife and said auxiliary heating means, and means for lowering said knife and auxiliary heating means together.

6. A sheet cutting machine for cutting sheets from blocks of low-flammable celluloid-like materials having a basis of low-flammable cellulose derivative and substantially free from volatile solvent, said machine comprising in combination a reciprocating bed for the block, a sheet cutting knife disposed above the bed and adapted to be raised and lowered, resiliently mounted surface layer heating plates disposed above the bed before and behind the knife and adapted to be raised and lowered and in the lowered position to contact with the surface of the block in the reciprocation and thereby to heat the surface layers of the block, and means for heating said knife and said surface layer heating plates.

7. A sheet cutting machine for cutting sheets from blocks of low-flammable celluloid-like materials having a basis of low-flammable cellulose derivative and substantially free from volatile solvent, said machine comprising in combination a reciprocating bed for the block, a sheet cutting knife disposed above the bed and adapted to be raised and lowered, resiliently mounted surface layer heating plates disposed above the bed before and behind the knife and adapted to be lowered together with the knife and in the lowered position to contact with the surface of the block in the reciprocation and thereby to heat the surface layers of the block, means for heating said knife and surface layer heating plates, and means for lowering the knife and surface layer heating plates together.

8. A sheet cutting machine for cutting sheets from blocks of low-flammable celluloid-like materials having a basis of low-flammable cellulose derivative and substantially free from volatile solvent, said machine comprising a sheet cutting knife in combination with means for heating the same by electric induction.

9. A sheet cutting machine for cutting sheets from blocks of low-flammable celluloid-like materials having a basis of low-flammable cellulose derivative and substantially free from volatile solvent, said machine comprising a sheet cutting knife, an auxiliary heating device adapted to contact with the surface of the block and thereby to heat the surface layers of the block, and means for heating said knife and said auxiliary heating device by electric induction.

In testimony whereof we have hereunto subscribed our names.

FREDERICK TROUTON SMALL.
WILLIAM ALEXANDER DICKIE.